Jan. 24, 1928.

P. D. BARRETT 1,657,191

ELECTRICAL INDICATING SYSTEM

Filed Nov. 30, 1925

INVENTOR
PAUL D. BARRETT
BY White & Prost
his ATTORNEYS

Patented Jan. 24, 1928.

1,657,191

UNITED STATES PATENT OFFICE.

PAUL D. BARRETT, OF SAN FRANCISCO, CALIFORNIA, ASSIGNOR OF ONE-HALF TO CHARLES F. WILSON, OF SAN FRANCISCO, CALIFORNIA.

ELECTRICAL INDICATING SYSTEM.

Application filed November 30, 1925. Serial No. 72,086.

This invention relates to an electrical indicating system for theatres and the like and has for its object the provision of an improved simple and efficient system of this character. More particularly the invention relates to a system in which each seat is provided with an electric light controlled by a switch actuated by the occupancy of the seat. All of the lights in a row of seats are connected in parallel, and preferably their respective switches are opened when their respective seats are occupied. Each circuit of the lights in a given row is controlled by a remote switch conveniently positioned for operation by the head usher, such as in the rear of the theatre. Means are also provided in series with said lights for indicating the number thereof connected in the circuit. Thus the head usher may close the switch for a given row and ascertain the number of unoccupied seats therein. Each row of seats is also provided with a light adjacent to the aisle and controlled by the remote switch which controls the seat lights in said row. Thus by closing the switch of a given row, the same is indicated to the patron by the aisle lamp, and the vacant seats are indicated by the respective lights on the seats. The system therefore not only indicates at a remote point the number of seats vacant in a given row, but also provides means for indicating the row in which the vacant seats are as well as the seats themselves.

The invention possesses other advantageous features, some of which, with the foregoing, will be set forth at length in the following description, where I shall outline in full, that form of my invention which I have selected for illustration in the drawings accompanying and forming part of the present specification. In said drawings I have shown one form of the electrical signalling system embodying my invention, but it is to be understood that I do not limit myself to such form, since the invention, as set forth in the claims, may be embodied in a plurality of forms.

Referring to the drawings.

Figure 1:
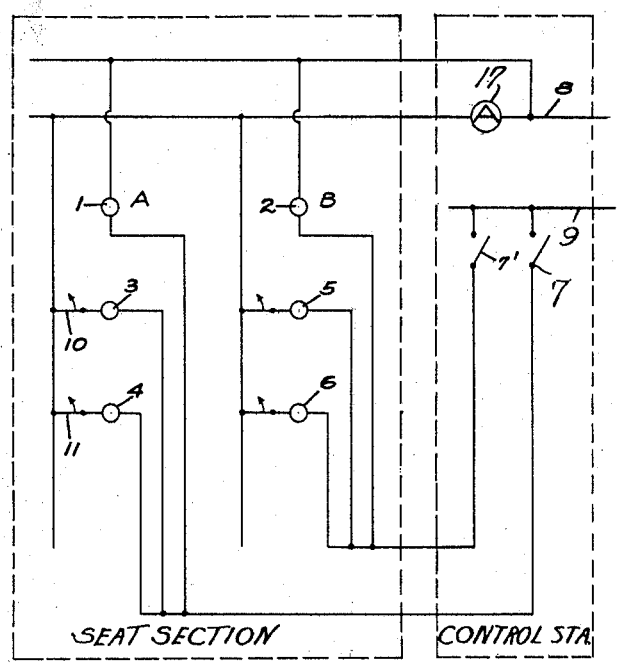
Fig. 1 is a diagram of the circuits in a system embodying my invention.

In Fig. 1, I have shown a system embodying my invention as applied to two rows of seats marked A and B, each row being provided with an aisle light 1 and 2 respectively, and seat lights 3, 4 and 5 and 6 respectively. While only two rows of seats, having two seats each are shown, it is of course understood that the system may include any number of rows with any number of seats therein, the number of rows and seats shown being deemed sufficient to illustrate my invention. Inasmuch as all of the rows of seats are controlled in a similar manner, a description of one row will be sufficient for the purpose hereof, and row A will therefore be described.

The row A, which includes the aisle light 1 and seat lights 3 and 4, is controlled by a remote switch 7, which is conveniently located for operation by an attendant, usually the head usher of the theatre. The aisle light 1 is in series with switch 7 and connected across the supply mains 8, 9. Thus, when the switch 7 is closed, the aisle lamp is illuminated. This light is illuminated to indicate to the patron the aisle in which unoccupied seats are to be found. The seat lights 3 and 4 are each also connected across the mains in series respectively with the switch 7, and in parallel with each other. Each of the lights 3 and 4 are controlled by individual switches 10 and 11 respectively. These switches may be of any conventional type arranged to be closed normally and opened by the occupancy of the seat. Such a switch may be positioned in the cushion of the seat and operated by the pressure thereon when occupied, or it may be controlled by the downward movement of the seat when occupied. I do not wish to be limited to any particular means for controlling these switches, as it is obvious that this can be done in various ways.

Figure 2:
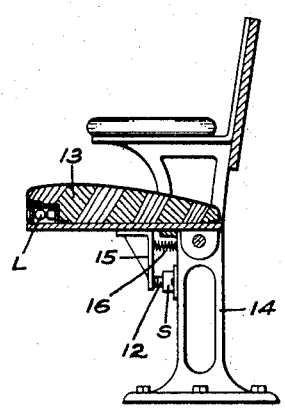
Fig. 2 is a side view of a seat illustrating a preferred arrangement of the light thereon and controlling switch therefor.

For the purpose of illustrating my invention, a preferred form of switch opened by the downward movement of the seat, is generally shown in Fig. 2, in which the switch S is of a standard type, arranged normally to close the circuit and having a push button 12 urged outwardly by suitable resilient means. The switch S is shown positioned underneath the seat 13 and supported on the leg 14 thereof. The seat 13 is provided with an arm 15 adapted to engage the button 12 and open the switch S when the seat is moved downwardly. Preferably the light L controlled by the switch S is positioned in the forward end of the seat as shown. It is of course understood that the light and switch may be positioned in other convenient locations, the principal consideration being that the light is visible to the patron and that it is controlled by the occupancy of the seat. Any suitable means may be provided for closing the switch S when the seat is unoccupied. Such means may comprise a coiled spring 16 positioned on the leg 14 and adapted to act against the arm 15. Thus when the switch 7 is closed, all of the lights associated with the unoccupied seats in the row controlled thereby are illuminated. In order to indicate to the operator at switch 7 the number of seats unoccupied in the row, an indicating instrument 17, generally in the form of an ammeter, calibrated to indicate the number of unoccupied seats in a row, is connected in series in the main 8 at a point near the switch 7. The row B is controlled in a similar manner through a switch 7'. In view of the foregoing detailed description, the operation of the invention will be apparent without additional remarks.

I claim:

1. An electrical indicating system for theatres and the like comprising a row of movable seats, an electric light on each seat, a switch for each light controlled by the movement of its respective seat, an aisle light, a remote switch for controlling the circuits of said seat lights and aisle light, each of said seat lights being connected in series with said latter switch and in parallel with each other and said aisle light being connected in series with said latter switch and means adjacent said latter switch and in series with said seat lights for indicating the number thereof connected in the circuit.

2. An electrical indicating system for theatres and the like comprising a row of movable seats, an electric light on each seat visible when the seat is unoccupied, a switch for each light arranged normally to open the light circuit when the seat is occupied and to close the light circuit when the seat is unoccupied, a light for the row of seats visible in the adjacent aisle, a remote switch for controlling all of the light circuits, said seat lights being in series with said switch and in parallel with each other and said aisle light being in series with said switch and in parallel with said seat lights whereby when said remote switch is closed, the aisle light and the seat lights are illuminated and means adjacent said remote switch and in series with said seat light for indicating the number thereof connected in the circuit by its respective switch.

3. An electrical indicating system for theatres and the like comprising a row of individually movable seats, a light on each seat, a switch on each seat actuated by the movement thereof for the associated light, an electric circuit in which all of said lights are connected in parallel, a remote switch in said circuit, an indicator in said circuit for indicating the current therein corresponding to the number of said lights being energized, an aisle light, an electric circuit for said aisle light controlled by said remote switch but excluding said indicator.

In testimony whereof, I have hereunto set my hand.

PAUL D. BARRETT.